US012595357B2

(12) United States Patent
Dhinojwala et al.

(10) Patent No.: US 12,595,357 B2
(45) Date of Patent: Apr. 7, 2026

(54) BLACK KNOT MELANIN—A SUPER-ADDITIVE WITH UV ABSORBING AND ANTIOXIDANT PROPERTIES

(71) Applicant: The University of Akron, Akron, OH (US)

(72) Inventors: Ali Dhinojwala, Akron, OH (US);
Saranshu Singla, Sangrur (IN);
Dharamdeep Jain, Jammu (IN)

(73) Assignee: The University of Akron, Akron, OH (US)

( * ) Notice: Subject to any disclaimer, the term of this patent is extended or adjusted under 35 U.S.C. 154(b) by 750 days.

(21) Appl. No.: 17/828,703

(22) Filed: May 31, 2022

(65) Prior Publication Data

US 2023/0031761 A1 Feb. 2, 2023

Related U.S. Application Data

(60) Provisional application No. 63/227,640, filed on Jul. 30, 2021.

(51) Int. Cl.
C08K 11/00 (2006.01)
C08J 3/26 (2006.01)
(Continued)

(52) U.S. Cl.
CPC ................. C08K 11/00 (2013.01); C08J 3/26 (2013.01); C09D 5/32 (2013.01); C09D 7/63 (2018.01);
(Continued)

(58) Field of Classification Search
CPC .. C08K 11/00; C08K 5/053; C08K 2201/012; C08J 3/26; C08J 2307/00; C08J 2329/04;
(Continued)

(56) References Cited

U.S. PATENT DOCUMENTS 5,047,447 A 9/1991 Gallas
11,045,493 B2 6/2021 Gianneschi et al.
(Continued)

FOREIGN PATENT DOCUMENTS

CN 103566776 B 2/2014
CN 109758383 A 5/2019
(Continued)

OTHER PUBLICATIONS

K.-Y. Ju, Y. Lee, S. Lee, S. B. Park, and J.-K. Lee, "Bioinspired polymerization of dopamine to generate melanin-like nanoparticles having an excellent free-radical-scavenging property," Biomacromolecules, vol. 12, No. 3, pp. 625-632, 2011.
(Continued)

*Primary Examiner* — Jessica M Roswell
(74) *Attorney, Agent, or Firm* — Renner, Kenner, Greive, Bobak, Taylor & Weber Co., LPA

(57) ABSTRACT

In one or more embodiments, the present invention provides a polymer composition for use in, cosmetics, coatings, inks, polymer compounding formulation comprising an all-natural, DHN-based, nitrogen-free black knot fungal (BKF) allomelanin extracted from black knots (a fungal growth formed by *Apiosporina morbosa*). The BKF melanin is naturally sourced, economically extracted, and quite unexpectedly, has been found to have better UV absorbing and antioxidant properties than synthetic melanin (polydopamine) and commercially available sepia melanin. In various embodiments, a small amount of the BKF melanin is substantially uniformly blended into a polymer or similar material to create a composition having excellent UV absorption and antioxidant properties. Surprisingly, it has also been found that the UV absorption and antioxidant properties of these polymer compositions can withstand heating and other processing steps associated with polymers,
(Continued)

and in particular, rubber without significant reduction in effectiveness.

21 Claims, 6 Drawing Sheets

(51) Int. Cl.

| | | |
|---|---|---|
| C09D 5/32 | (2006.01) | |
| C09D 7/63 | (2018.01) | |
| C09D 107/00 | (2006.01) | |

(52) U.S. Cl.
CPC ......... *C09D 107/00* (2013.01); *C08J 2307/00* (2013.01); *C08K 2201/012* (2013.01)

(58) Field of Classification Search
CPC .............. C08J 2329/246128; C08J 3/20; C08J 2461/28; C09D 5/32; C09D 7/63; C09D 107/00

See application file for complete search history.

(56) References Cited

U.S. PATENT DOCUMENTS

| | | | |
|---|---|---|---|
| 2005/0042186 A1 | 2/2005 | Zahner | |
| 2005/0230347 A1 | 10/2005 | Gallas et al. | |
| 2021/0269646 A1 | 9/2021 | Zhu et al. | |
| 2022/0072763 A1* | 3/2022 | Cordero ................... | F24S 70/14 |

FOREIGN PATENT DOCUMENTS

| | | |
|---|---|---|
| CN | 108864673 B | 1/2020 |
| CN | 110982123 A | 4/2020 |
| CN | 112225894 A | 1/2021 |
| CN | 111228141 B | 2/2021 |
| CN | 113061256 A | 7/2021 |
| CN | 113069372 A | 7/2021 |
| CN | 110279613 A | 8/2021 |
| CN | 110983791 A | 3/2022 |
| EP | 0847747 B1 | 1/2003 |
| ES | 2751200 A1 | 3/2020 |
| KR | 101922489 B1 | 11/2018 |
| KR | 102269990 B1 | 6/2021 |
| WO | 2014132012 A1 | 9/2014 |

OTHER PUBLICATIONS

M. Xiao, Y. Li, M. C. Allen, D. D. Deheyn, X. Yue, J. Zhao, N. C. Gianneschi, M. D. Shawkey, and A. Dhinojwala, "Bio-inspired structural colors produced via self-assembly of synthetic melanin nanoparticles," ACS nano, vol. 9, No. 5, pp. 5454-5460, 2015.

C. Wang, D. Wang, T. Dai, P. Xu, P. Wu, Y. Zou, P. Yang, J. Hu, Y. Li, and Y. Cheng, "Skin pigmentation-inspired polydopamine sunscreens," Advanced Functional Materials, vol. 28, No. 33, p. 1802127, 2018.

Łopusiewicz, Ł., Jędra, F., & Mizielińska, M. (2018). New poly (lactic acid) active packaging composite films incorporated with fungal melanin. Polymers, 10(4), 386.

Wang, Y., Wang, X., Li, T., Ma, P., Zhang, S., Du, M., . . . & Chen, M. (2018). Effects of melanin on optical behavior of polymer: from natural pigment to materials applications. ACS applied materials & interfaces, 10(15), 13100-13106.

X. Zhou, N. C. Mccallum, Z. Hu, W. Cao, K. Gnanasekaran, Y. Feng, J. F. Stoddart, Z. Wang, and N. C. Gianneschi, "Artificial allomelanin nanoparticles," ACS nano, vol. 13, No. 10, pp. 10980-10990, 2019.

Xie, W., Pakdel, E., Liu, D., Sun, L., & Wang, X. (2019). Waste-hair-derived natural melanin/TiO2 hybrids as highly efficient and stable UV-shielding fillers for polyurethane films. ACS Sustainable Chemistry & Engineering, 8(3), 1343-1352.

Roy, S., & Rhim, J. W. (2019). Preparation of carrageenan-based functional nanocomposite films incorporated with melanin nanoparticles. Colloids and Surfaces B: Biointerfaces, 176, 317-324.

Roy, S., & Rhim, J. W. (2019). Agar-based antioxidant composite films incorporated with melanin nanoparticles. Food Hydrocolloids, 94, 391-398.

Xing, Q., Buono, P., Ruch, D., Dubois, P., Wu, L., & Wang, W. J. (2019). Biodegradable UV-blocking films through core-shell lignin-melanin nanoparticles in poly (butylene adipate-co-terephthalate). ACS Sustainable Chemistry & Engineering, 7(4), 4147-4157.

Roy, S., & Rhim, J. W. (2019). Carrageenan-based antimicrobial bionanocomposite films incorporated with ZnO nanoparticles stabilized by melanin. Food Hydrocolloids, 90, 500-507.

Liang, Y., Xie, W., Pakdel, E., Zhang, M., Sun, L., & Wang, X. (2019). Homogeneous melanin/silica core-shell particles incorporated in poly (methyl methacrylate) for enhanced UV protection, thermal stability, and mechanical properties. Materials Chemistry and Physics, 230, 319-325.

Roy, S., Kim, H. C., Kim, J. W., Zhai, L., Zhu, Q. Y., & Kim, J. (2020). Incorporation of melanin nanoparticles improves UV-shielding, mechanical and antioxidant properties of cellulose nanofiber based nanocomposite films. Materials Today Communications, 24, 100984.

J. Hu, L. Yang, P. Yang, S. Jiang, X. Liu, and Y. Li, "Polydopamine free radical scavengers," Biomaterials Science, vol. 8, No. 18, pp. 4940-4950, 2020.

J.-J. Oh, J. Y. Kim, S. L. Kwon, D.-H. Hwang, Y.-E. Choi, and G.-H. Kim, "Production and characterization of melanin pigments derived from amorphotheca resinae," Journal of Microbiology, vol. 58, pp. 648-656, 2020.

Yang, M., Li, L., Yu, S., Liu, J., & Shi, J. (2020). High performance of alginate/polyvinyl alcohol composite film based on natural original melanin nanoparticles used as food thermal insulating and UV-vis block. Carbohydrate polymers, 233, 115884.

Roy, S., Kim, H. C., Zhai, L., & Kim, J. (2020). Preparation and characterization of synthetic melanin-like nanoparticles reinforced chitosan nanocomposite films. Carbohydrate polymers, 231, 115729.

Y. Wongngam, G. Supanakorn, R. Thiramanas, and D. Polpanich, "Smaller is not always better: Large-size hollow polydopamine particles act as an efficient sun protection factor booster for sunscreens," ACS Biomaterials Science & Engineering, 2021.

S. D. Seelam, D. Agsar, P. R. Shetty, S. Vemireddy, K. M. Reddy, M. Umesh, C. Rajitha, et al., "Characterization and photoprotective potentiality of lime dwelling pseudomonas mediated melanin as sunscreen agent against uv-b radiations," Journal of Photochemistry and Photobiology B: Biology, vol. 216, p. 112126, 2021.

Singla, S., Htut, K. Z., Zhu, R., Davis, A., Ma, J., Ni, Q. Z., . . . & Dhinojwala, A. (2021). Isolation and Characterization of Allomelanin from Pathogenic Black Knot Fungus—a Sustainable Source of Melanin. ACS omega 2021, 6, 51, 35514-35522.

S. Eskandari and Z. Etemadifar, "Melanin biopolymers from newly isolated pseudomonas koreensis strain uis 19 with potential for cosmetics application, and optimization on molasses waste medium," Journal of Applied Microbiology, 2021.

Candau, Nicolas, et al., "Strain induced crystallization in vulcanized natural rubber containing ground tire rubber particles with reinforcement and nucleation abilities," Polymer Testing 101 (2021): 107313.

J.-J. Oh, J. Y. Kim, S. H. Son, W.-J. Jung, J.-W. Seo, G.-H. Kim, et al., "Fungal melanin as a biocompatible broad-spectrum sunscreen with high antioxidant activity," RSC Advances, vol. 11, No. 32, pp. 19682-19689, 2021.

Roy, S., & Rhim, J. W. (2021). Fabrication of pectin/agar blended functional film: Effect of reinforcement of melanin nanoparticles and grapefruit seed extract. Food Hydrocolloids, 118, 106823.

Łopusiewicz, Ł., Kwiatkowski, P., Drozłowska, E., Trocer, P., Kostek, M., Śliwiński, M., ... & Sienkiewicz, M. (2021). Preparation and characterization of carboxymethyl cellulose-based bioactive composite films modified with fungal melanin and carvacrol. Polymers, 13(4), 499.

(56) References Cited

OTHER PUBLICATIONS

Ram, F., Yadav, P. & Shanmuganathan, K. Nanocellulose/melanin-based composites for energy, environment, and biological applications. J Mater Sci 57, 14188-14216 (2022). https://doi.org/10.1007/s10853-022-07512-1.

* cited by examiner

BLACK KNOT MELANIN—A SUPER-ADDITIVE WITH UV ABSORBING AND ANTIOXIDANT PROPERTIES

CROSS REFERENCE TO RELATED APPLICATIONS

This application claims the benefit of U.S. provisional patent application Ser. No. 63/227,460 entitled "Black Knot Melanin—A Super-additive with UV absorbing and Anti-oxidant Properties," filed Jul. 30, 2021, and incorporated herein by reference in its entirety.

STATEMENT REGARDING FEDERALLY SPONSORED RESEARCH OR DEVELOPMENT SUPPORT

This invention was made with government support under FA9550-18-1-0142 awarded by U.S. Air Force Office of Scientific Research. The government has certain rights in the invention.

FIELD OF THE INVENTION

One or more embodiments of the present invention relates to antioxidant and UV absorbing additives. In certain embodiments, the present invention is directed to antioxidant and UV absorbing additives comprising melanin derived from black knot fungi.

BACKGROUND OF THE INVENTION

Polymers, when exposed to factors such as heat, mechanical stress, light, oxygen, chemicals, and water undergo degradation. The exposure leads to alteration in the physical and chemical structure and decrease in the molecular weight of the polymer. This in turn, causes a change in properties such as shape, color, appearance, mechanical strength of the polymer. Polymer degradation, such as photo-oxidation (action of light) or thermal (action of heat) occur by a chain scission mechanism, where an external factor cleaves polymer chains to form free radicals that propagate to yield oligomers and ultimately polymers. Since free radicals are highly unstable, they also lead to unwanted chemical reactions. Degradation is undesirable for many applications as it can cause a loss in the performance during the service life of the product.

While formulating polymer-based materials, certain additives are included in the formulation to combat the degradation mechanism occurring during the processing of the formulation or lifetime of the product. These additives are often termed as stabilizers and include light stabilizers, UV absorbers and antioxidants. Light stabilizers help in preventing the degradation of the polymer due to JV radiation. The most common one used are based on Hindered Amine Light Stabilizers (HALS) which act by scavenging the free radicals produced during the degradation process. They are generally used in combination with another type of additive, UV absorbers which protect the polymer due to their high UV absorbing capability and dissipate the absorbed UV energy as heat without altering the properties of the polymer. Examples of common UV absorbers include benzophenone, benzotriazole and triazines. Antioxidants being primary and secondary by type, retard the interaction of the polymer with atmospheric oxygen and prevent the oxidative degradation. Primary and secondary antioxidants act by removal of the free radicals and hydroperoxide radicals respectively, generated during the oxidation process. Examples include hindered phenolics, aromatic amines, phosphites, phosphonites based compounds.

In addition to polymers-based materials where UV absorbers and antioxidants are incorporated to increase the shelf life of the product, UV-absorbers and antioxidants are also highly desirable in cosmetic applications (in particular, sunscreens) to counteract the negative effects of sun's powerful UV rays on the skin. This has led to an increase in the use of sunscreens to minimize the risk of sunburns, skin cancer, and premature ageing (dark spots, wrinkles). Currently, there are two types of sunscreens available on the market to protect your skin depending upon the working mechanism: physical (also known as mineral) sunscreen and chemical sunscreen. Physical sunscreens use inorganic particles such as zinc oxide and titanium dioxide (only these two are FDA-approved) to form a physical barrier on the surface of the skin that helps scatter and reflect UV rays away from the skin. On the other hand, chemical sunscreens include active chemical agents that absorb UV rays before they can harm your skin and transform radiation into heat. Common active ingredients used in chemical sunscreens include oxybenzone, avobenzone, octisalate, octocrylene, homosalate, ethylhexylmethoxycinnamate, and octinoxate. Since physical sunscreens tend to leave white residue behind on the skin, chemical sunscreens are preferred. However, some of the active ingredients used in chemical sunscreens, in particular, oxybenzone or octinoxate, have been shown to have toxic effects to human health, coral reefs, and marine species. Some states in the United States have passed a law recently prohibiting the use of avobenzone and octocrylene following a ban on oxybenzone and octinoxate passed in 2018. Therefore, other alternative especially ones derived from natural sources have become more appealing.

With the growing focus on sustainability and green environment, great emphasis has been paid on identifying materials that could serve as UV absorbers or antioxidants. Melanin is a natural occurring pigment found in many organisms that possesses many unique properties including high refractive index, broadband absorption from UV to the visible range, metal ion sequestration, radical scavenging, and many others, and therefore could serve as an additive for polymers and cosmetics. Typically melanin can be broadly categorized into three different groups on the basis of their structure and monomer units: eumelanin (made from 5,6-dihydroxyl indole (DHI) and 5,6-dihydroxylindole-2carboxylic acid (DHICA)), pheomelanin (containing 5-S-cysteinyl-dopa (5SCD) and 2-S-cysteinyldopa (2SCD)), and allomelanin (including pyomelanin, DHN melanin, 1,4,6,7,9,12-hexahydroxyperylene-3,10-quinone (HPQ)-melanin, and catechol melanin), with eumelanin being the most common one.

In the past, melanin either sourced naturally or prepared synthetically, has been incorporated with polymers for serving different applications with respect to its stabilizing property. Examples include packaging films, biomedical systems, nanocomposites, optical and photoprotective materials. With respect to natural source, melanin has been extracted from sepia ink, hair of yak and alpaca, watermelon seeds and fungus sources including agricultural waste. The extracted natural melanin has been i) mixed with polymers like PMMA, PS, PP, PVA, LLDPE, EVA Copolymers, Polycarbonate, Polyurethane, PLA, PHB, agar, gelatin, pectin, carrageenan; ii) applied as a coating on wool fibers in the form of hybrid material in combination with $TiO_2$. On the other hand, synthetic melanins have been prepared as aqueous solutions with precursors such as L-DOPA, dopamine and catechol. In one case, melanin solution is mixed with PVA to form laminates for potential optical applications that block UV and high energy radiation such as sunglasses, helmets, windows, filters for artificial lightning, ski googles and lenses. (See, e.g., U.S. Pat. No. 7,029,758 B2, the disclosure of which is incorporated herein by reference in its entirety. Another synthetic route includes oxidation of melanin precursors such as catechol, dopamine, L-3,4-dihydroxyphenylalanine (L-DOPA), DHI in presence of sodium hydroxide, copper catalyst and bleach, and thereafter use the solution to tint plastic films and sheets for optical applications like sunglasses, lenses, windows and filters. (See, e.g., U.S. Application Publication No. 2005/0230347 A1, the disclosure of which is incorporated herein by reference in its entirety.) Melanin has been also synthesized to use as sunglass pigment by free radical polymerization of precursors like DOPA, dopamine, catechol, DHI, leucodopachrome, tryptamine, serotonin, DHICA, epinephrine, norepinephrine, tyrosine, adrenochrome, and 1,8-dihydroxynapthalene (DHN). (See, e.g., U.S. Pat. No. 5,047,447, the disclosure of which is incorporated herein by reference in its entirety.)

Prior efforts on using melanin in sunscreen applications have primarily focused on using synthetic polydopamine (PDA) nanoparticles in the form of solid nanoparticles (See, e.g., U.S. Pat. No. 11,045,493 B2 and Spanish Patent No. 2751200A1), hollow nanoparticles (See, e.g., Chinese Patent No. 108864673 B), PDA-coated solid or porous templates (See, e.g., Chinese Patent No. 110983791A and Korean Patent No. 101922489B1), where PDA helps in blocking the UV-light or scavenge free radicals. (See also, J. Hu, L. Yang, P. Yang, S. Jiang, X. Liu, and Y. Li, "Polydopamine free radical scavengers," Biomaterials Science, vol. 8, no. 18, pp. 4940-4950, 2020 and Y. Wongngam, G. Supanakorn, R. Thiramanas, and D. Polpanich, "Smaller is not always better: Large-size hollow polydopamine particles act as an efficient sun protection factor booster for sunscreens," ACS Biomaterials Science & Engineering, 2021, the disclosures of which are incorporated herein by reference in their entirety.) These synthetic PDA nanoparticles are used on their own or mixed with various polymers (gelatin, PVA, PLA, Epoxy resin, PEO, chitosan, multi-arm polymer with sulfydryl, amino or boric acid groups) and inorganic materials (titanium dioxide) to create sunscreen formulations with or without an active chemical agent (See, e.g., Chinese Patent No. 111228141B; Chinese Application Publication Nos. 109758383A, 112225894A, 113061256A, 110279613A, and 113069372A; Korean Patent No. 102269990 B1; and C. Wang, D. Wang, T. Dai, P. Xu, P. Wu, Y. Zou, P. Yang, J. Hu, Y. Li, and Y. Cheng, "Skin pigmentation-inspired polydopamine sunscreens," Advanced Functional Materials, vol. 28, no. 33, p. 1802127, 2018, the disclosures of which are incorporated herein by reference in their entirety.)

More recently, melanin has been extracted from Amorphotheca resinae and mixed with Nivea base cream to create sunscreens with varying melanin loading and evaluated their sunscreen performance, antioxidant activity, and cytotoxicity. (See, e.g., J.-J. Oh, J. Y. Kim, S. L. Kwon, D.-H. Hwang, Y.-E. Choi, and G.-H. Kim, "Production and characterization of melanin pigments derived from amorphotheca resinae," Journal of Microbiology, vol. 58, pp. 648-656, 2020 and J.-J. Oh, J. Y. Kim, S. H. Son, W.-J. Jung, J.-W. Seo, G.-H. Kim, et al., "Fungal melanin as a biocompatible broad-spectrum sunscreen with high antioxidant activity," RSC Advances, vol. 11, no. 32, pp. 19682-19689, 2021, the disclosures of which are incorporated herein by reference in their entirety.) The fungal melanin used in this study is similar to sepia melanin.

Eskandari and Seelam et al. extracted melanin from two bacteria Pseudomonas koreensis and Pseudomonas otitidis and discussed their potential in sunscreen applications as a UV absorber and an antioxidant. See, e.g., S. D. Seelam, D. Agsar, P. R. Shetty, S. Vemireddy, K. M. Reddy, M. Umesh, C. Rajitha, et al., "Characterization and photoprotective potentiality of lime dwelling pseudomonas mediated melanin as sunscreen agent against uv-b radiations," Journal of Photochemistry and Photobiology B: Biology, vol. 216, p. 112126, 2021 and S. Eskandari and Z. Etemadifar, "Melanin biopolymers from newly isolated pseudomonas koreensis strain uis 19 with potential for cosmetics application, and optimization on molasses waste medium," Journal of Applied Microbiology, 2021, the disclosures of which are incorporated herein by reference in their entirety.)

Recently, it has been found that black knots are rich in melanin and can be used for obtaining melanin at a cheaper cost than the commercially available melanin (synthetic melanin and sepia melanin, both 450 USD/g). The extracted melanin was identified as a nitrogen-free allomelanin. (See, e.g., U.S. Application Publication No. 2021/0269646 A1, the disclosure of which is incorporated herein by reference in its entirety.)

Accordingly, what is need in the art is a polymer composition, cosmetics, coatings, inks, polymer compounding formulations, and additives that take advantage of the UV absorbing and antioxidant properties of the all-natural, nitrogen-free black knot fungal (BKF) allomelanin, eliminating the use of different types of synthetic stabilizer additives in the formulation.

SUMMARY OF THE INVENTION

In one or more embodiments, the present invention provides a polymer composition, cosmetics, coatings, inks, polymer compounding formulation comprising an all-natural, nitrogen-free black knot fungal (BKF) allomelanin extracted from black knots, which are a fungal growth formed by the Apiosporina morbosa (referred to herein as "BKF melanin" or "BKF allomelanin"). The BKF melanin has been found to be DHN-based nitrogen-free allomelanin. It is naturally sourced and can be economically extracted from what is basically a waste product. Moreover, and quite unexpectedly, BKF melanin has been found to have better UV absorbing and antioxidant properties than synthetic melanin (polydopamine) and commercially available sepia melanin. In some embodiments of the present invention, a small amount of the BKF melanin is uniformly blended into a polymer or similar material to create a composition having excellent UV absorption and antioxidant properties. In some of these embodiments, this composition can be added to various products to provide UV absorption and antioxidant properties. Surprisingly, it has also been found that the UV absorption and antioxidant properties of these polymer compositions can withstand heating and other processing steps associated with polymers, and in particular, rubber without significant reduction in effectiveness.

BKF melanin offers several advantages to these compositions over conventional stabilizer additives. First, it is a natural product, hence replacing the synthetic chemical additives with this would support ongoing efforts towards sustainability. Second, since it offers both UV absorption and antioxidant properties, it could serve as a super-additive package and eliminate the use of different types of synthetic stabilizer additives in the formulation. Third, it could serve as a pigment for applications such as cosmetics, coatings, inks, and polymer compounding formulations including rubbers.

In a first aspect, the present invention is directed to a UV-radiation absorbing and antioxidant polymer composition comprising: a polymer having a glass transition temperature ($T_g$) of 300° C. or less; and an allomelanin extracted from a black knot (*Apiosporina morbosa*) fungal growth comprising UV-radiation absorbing and antioxidant properties; wherein the allomelanin is substantially uniformly distributed throughout the polymer and the UV-radiation absorbing and antioxidant properties are incorporated into the polymer composition. In various embodiments, the polymer is selected from the group consisting of epoxides, siloxanes, rubber, acrylates, polyethylene, polypropylene, polystyrene, polyisobutylene, polybutadiene, polylactic acid, polyvinyl alcohol, and combinations thereof. In some of these embodiments, the polymer is a thermoplastic or thermoset polymer. In some embodiments, the polymer is rubber.

In one or more embodiments, the UV-radiation absorbing and antioxidant polymer composition of the present invention includes any one or more of the above referenced embodiments of the first aspect of the present invention wherein the allomelanin comprises particles having a mean diameter of from about 50 nm to about 1000 nm. In one or more embodiments, the UV-radiation absorbing and antioxidant polymer composition of the present invention includes any one or more of the above referenced embodiments of the first aspect of the present invention wherein the polymer composition comprises from about 0.1 wt. % to about 5 wt. % of the allomelanin. In one or more embodiments, the UV-radiation absorbing and antioxidant polymer composition of the present invention includes any one or more of the above referenced embodiments of the first aspect of the present invention wherein the polymer composition comprises from about 1 wt. % to about 5 wt. % of the allomelanin. In one or more embodiments, the UV-radiation absorbing and antioxidant polymer composition of the present invention includes any one or more of the above referenced embodiments of the first aspect of the present invention wherein the polymer composition comprises a paint, coating, sunscreen, packaging, composites or cosmetic product.

In a second aspect, the present invention is directed to a method of making for making the UV-light absorbing and antioxidant polymer composition described above comprising: extracting allomelanin from a black knot (*Apiosporina morbosa*) fungal growth using an acid-base extraction process, the allomelanin having UV radiation absorption and antioxidant properties; selecting a one part or two part polymer having a glass transition temperature ($T_g$) of 300° C. or less wherein the two part polymer, if present, comprises and polymer resin and a curing agent; heating a polymer or polymer resin to a temperature above its $T_g$ but less than 310° C.; adding from about 0.1% to about 5% by weight of the extracted allomelanin, and adding the curing agent if a two part polymer was used; blending the mixture until the extracted allomelanin is distributed evenly throughout the polymer mixture; and curing or allowing the polymer mixture containing the allomelanin to harden and/or cure to form the UV-light blocking and antioxidant polymer composition; wherein the UV-light absorbing and antioxidant properties of the allomelanin are incorporated into the polymer composition to form the UV-light absorbing and antioxidant polymer composition, as discussed above.

In one or more embodiments, the method of making for making the UV-light absorbing and antioxidant polymer composition includes any one or more of the above referenced embodiments of the second aspect of the present invention wherein the one part or two part polymer is selected from the group consisting of epoxides, siloxanes, rubber, acrylates, polyethylene, polypropylene, polystyrene, polyisobutylene, polybutadiene, polylactic acid, polyvinyl alcohol, polyurethanes, polyesters and biopolymers including chitosan, alginate, gelatin, and combinations thereof. In one or more embodiments, the method of making for making the UV-light absorbing and antioxidant polymer composition includes any one or more of the above referenced embodiments of the second aspect of the present invention wherein the one part or two-part polymer is a thermoplastic or thermoset polymer. In one or more embodiments, the method of making for making the UV-light absorbing and antioxidant polymer composition includes any one or more of the above referenced embodiments of the second aspect of the present invention wherein the one part or two-part polymer is rubber. In one or more embodiments, the method of making for making the UV-light absorbing and antioxidant polymer composition includes any one or more of the above referenced embodiments of the second aspect of the present invention wherein the one part or two-part polymer is rubber, and the step of curing comprises heating the allomelanin/polymer mixture to a curing temperature until the polymer is cured.

In one or more embodiments, the method of making for making the UV-light absorbing and antioxidant polymer composition includes any one or more of the above referenced embodiments of the second aspect of the present invention wherein the polymer composition is a paint, coating, sunscreen, packaging, composite or cosmetic product. In one or more embodiments, the method of making for making the UV-light absorbing and antioxidant polymer composition includes any one or more of the above referenced embodiments of the second aspect of the present invention wherein the polymer composition is a coating further comprises applying the allomelanin/polymer mixture to a surface.

In a third aspect, the present invention is directed to a method of reducing UV-radiation and antioxidant damage to a polymer composition comprising: extracting allomelanin from a black knot (*Apiosporina morbosa*) fungal growth using an acid-base extraction process, the allomelanin having UV radiation absorption and antioxidant properties; selecting a one part or two part polymer having a glass transition temperature ($T_g$) of 300° C. or less wherein the two part polymer, if present, comprises a polymer resin and a curing agent; heating a polymer or polymer resin to a temperature above its $T_g$ but less than 310° C.; adding from about 0.1% to about 5% by weight of the extracted allomelanin, and adding the curing agent, if a two part polymer was used; blending the mixture until the extracted allomelanin is distributed evenly throughout the polymer mixture; and curing or allowing the polymer mixture containing the allomelanin to harden and/or cure; wherein the UV radiation absorption and antioxidant properties of the allomelanin are incorporated into the polymer composition thereby reducing the damage suffered by the polymer composition upon exposure to UV radiation and/or free radicals.

In one or more embodiments, the reducing UV-radiation and antioxidant damage to a polymer composition includes any one or more of the above referenced embodiments of the third aspect of the present invention wherein the one part or two part polymer is selected from the group consisting of epoxides, siloxanes, rubber, acrylates, polyethylene, polypropylene, polystyrene, polyisobutylene, polybutadiene, polylactic acid, polyvinyl alcohol, polyurethanes, polyesters and biopolymers including chitosan, alginate, gelatin, and combinations thereof. In one or more embodiments, the reducing UV-radiation and antioxidant damage to a polymer composition includes any one or more of the above referenced embodiments of the third aspect of the present invention wherein the one part or two-part polymer is a thermoplastic or thermoset polymer. In one or more embodiments, the reducing UV-radiation and antioxidant damage to a polymer composition includes any one or more of the above referenced embodiments of the third aspect of the present invention wherein the one part or two-part polymer is rubber.

In one or more embodiments, the reducing UV-radiation and antioxidant damage to a polymer composition includes any one or more of the above referenced embodiments of the third aspect of the present invention wherein the polymer composition is a coating and step of blending further comprises the step of applying the allomelanin/polymer mixture to a surface. In one or more embodiments, the reducing UV-radiation and antioxidant damage to a polymer composition includes any one or more of the above referenced embodiments of the third aspect of the present invention wherein the one part or two-part polymer is rubber, and the step of curing comprises heating the allomelanin/polymer mixture to a curing temperature until the polymer is cured.

BRIEF DESCRIPTION OF THE DRAWINGS

For a more complete understanding of the features and advantages of the present invention, reference is now made to the detailed description of the invention along with the accompanying figures in which.

Figure 1:
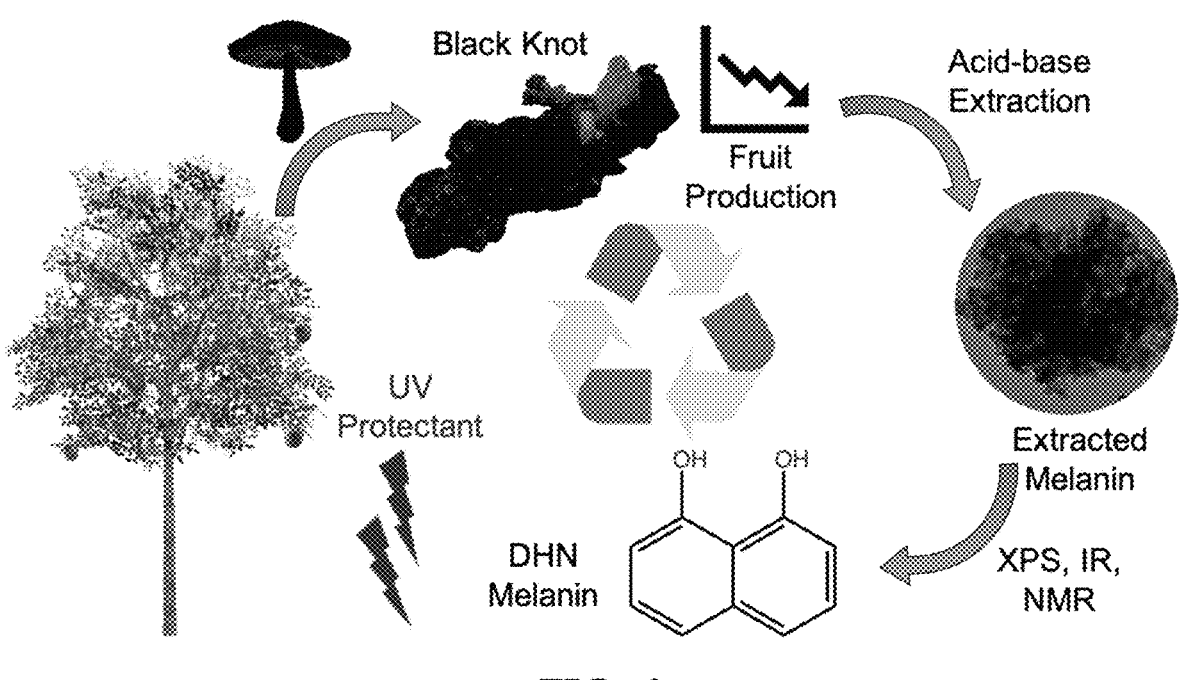
FIG. 1 is a schematic outlining how melanin is extracted from black knots, a disease caused by the pathogenic fungus *Apiosporina morbosa*, using an acid-base extraction procedure. The extracted melanin is a nitrogen-free DHN based allomelanin with irregular morphology.

DETAILED DESCRIPTION OF THE
ILLUSTRATIVE EMBODIMENTS

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

In one or more embodiments, the present invention provides a polymer composition, cosmetics, coatings, inks, polymer compounding formulation comprising an all-natural, nitrogen-free black knot fungal (BKF) allomelanin extracted from black knots, which are a fungal growth formed by the *Apiosporina morbosa* (referred to herein as "BKF melanin" or "BKF allomelanin"). The BKF melanin has been found to be DHN-based nitrogen-free allomelanin and can be economically extracted from what is basically a waste product. Surprisingly, and quite unexpectedly, it has been found the UV absorbing and antioxidant properties of BKF melanin are better than synthetic melanin (polydopamine) and commercially available sepia melanin. In some embodiments of the present invention, a small amount of the BKF melanin is uniformly blended into a polymer or similar material to create a composition having excellent UV absorption and antioxidant properties. In various embodiments, this composition may be added to, used in, or used on a product or material as an additive or coating to provide UV absorption and antioxidant properties. Surprisingly, it has also been found that the UV absorption and antioxidant properties of these polymer compositions can withstand heating and other processing steps associated with polymers, and in particular, thermoset polymers like rubber without significant reduction in effectiveness. Finally, because the BKF melanin provides both UV absorption and antioxidant properties, it can be used to replace two or more different conventional synthetic additives, making it more economical and environment friendly.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise.

Throughout this application, the term "about" is used to indicate that a value includes the inherent variation of error for the device, or the method being employed to determine the value, or the variation that exists among the samples being measured and is generally within two standard deviations of the mean. Unless otherwise stated or otherwise evident from the context, the term "about" means within 10% (i.e., within 10%, 9%, 8%, 7%, 6%, 5%, 4%, 3%, 2%, 1%, or less) above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents. Unless otherwise clear from context, all numerical values provided herein in the specification and the claim can be modified by the term "about."

It should also be understood that the ranges provided herein are a shorthand for all the values within the range and, further, that the individual range values presented herein can be combined to form additional non-disclosed ranges. For example, a range of 1 to 50 is understood to include not only 1 and 50, but any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

A polymer "comprises" or is "derived from" a stated monomer if that monomer is incorporated into the polymer. Thus, the incorporated monomer that the polymer comprises is not the same as the monomer prior to incorporation into a polymer, in that at the very least, certain terminal groups are incorporated into the polymer backbone. A polymer is said to comprise a specific type of linkage if that linkage is present in the polymer. As used herein, the term "homopolymer" refers to a polymer derived from a single monomeric species. And as follows, unless otherwise indicated, the term "copolymer" refers to a polymer derived from two, three or more monomeric species and includes alternating copolymers, periodic copolymers, random copolymers, statistical copolymers and block copolymers.

The terms "ultra-violet light," "UV-light," "UV light," "ultra-violet radiation," "UV-radiation" and "UV radiation" are used herein interchangeably to refer to 1 electromagnetic radiation (light) having a wavelength of from about 10 nm to about 400 nm. Similarly, as applied to a polymer or other material, the terms "ultra-violet light absorbing," "UV light absorbing," "UV absorbing," "ultra-violet radiation absorbing," "UV-radiation absorbing," and "UV radiation absorbing" refer broadly to the ability of a polymer or other material to absorb UV light, thereby blocking or reducing transmission of the UV light, or to a polymer or other material having that ability.

As used herein, the term "antioxidant" as applied to a property of a material refers to the ability of a material to remove oxidizing agents, such as free radicals, that can lead to an alteration in the physical and chemical structure and decrease in the molecular weight of the polymer. As will be apparent, the term "antioxidant" also may refer to a material having this property.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning, unless otherwise indicated.

Further, any compositions or methods provided herein can be combined with one or more of any of the other compositions and methods provided herein. The fact that given features, elements or components are cited in different dependent claims does not exclude that at least some of these features, elements or components maybe used in combination together.

In a first aspect, the present invention is directed to a UV-radiation absorbing and antioxidant polymer composition, as described below. In various embodiments, the UV-radiation absorbing and antioxidant polymer compositions of the present invention will comprise a polymer and a quantity of allomelanin extracted from a black knot (*Apiosporina morbosa*) fungal growth, where the BKF allomelanin is substantially uniformly distributed throughout said polymer. As set forth above, BKF allomelanin has excellent UV-radiation absorbing and antioxidant properties and when it is substantially uniformly distributed throughout said polymer, these UV-radiation absorbing and antioxidant properties are incorporated into the polymer composition.

The polymers chosen are not particularly limited except that the polymer must have a $T_g$ that is less than the temperature where the BKF melanin begins to change (approximately 300° C.) so that the polymer can be softened to allow the BKF melanin to be mixed throughout the polymer, as described below. Suitable polymers may include, without limitation, epoxides, siloxanes, rubber, acrylates, polyethylene, polypropylene, polystyrene, polyisobutylene, polybutadiene, polylactic acid, polyvinyl alcohol, or combinations thereof.

The UV-light blocking and antioxidant polymer composition described above wherein said polymer is selected from the group consisting of epoxides, siloxanes, rubber, acrylates, polyethylene, polypropylene, polystyrene, polyisobutylene, polybutadiene, polylactic acid, polyvinyl alcohol, and combinations thereof. In some embodiments, the polymer used may be a thermoset polymer, like rubber. In some other embodiments, the polymer used will be a thermoplastic.

The BKF melanin may be obtained by acid-base extraction from black knots produced as a fungal growth by *Apiosporina morbosa* and will comprise DNH-based allomelanin particles having a mean diameter of from about 50 nm to about 1000 nm. In some embodiments, the BKF melanin will have a mean diameter of from about 50 nm to about 900 nm, in other embodiments, from about 50 nm to about 700 nm, in other embodiments, from about 50 nm to about 500 nm, in other embodiments, from about 50 nm to about 400 nm, in other embodiments, from about 50 nm to about 300 nm, in other embodiments, from about 100 nm to about 1000 nm, in other embodiments, from about 200 nm to about 1000 nm, in other embodiments, from about 300 nm to about 1000 nm, and in other embodiments, from about 500 nm to about 1000 nm.

As set forth above, the BKF melanin is substantially uniformly distributed throughout the polymer. The BKR$_{[DJ1]}$ melanin will be understood to be substantially uniformly distributed when there is no perceivable difference in the BKF melanin concentration at any point in the polymer. As will be appreciated, the BKF melanin is black in color and will visibly darken the polymer. So, it will be apparent that the BKF melanin is substantially uniformly distributed throughout the polymer when the color of the polymer appears the same throughout its volume.

In various embodiments, the polymer composition may comprise from about 0.1 wt. % to about 5 wt. % of the BKG$_{[DJ2]}$ melanin. In some embodiments, the polymer composition may comprise from about 0.5 wt. % to about 5 wt. %, in other embodiments, from about 1 wt. % to about 5 wt. %, in other embodiments, from about 1.5 wt. % to about 5 wt. %, in other embodiments, from about 2 wt. % to about 5 wt. %, in other embodiments, from about 2.5 wt. % to about 5 wt. %, in other embodiments, from about 3 wt. % to about 5 wt. %, in other embodiments, from about 0.1 wt. % to about 3 wt. %, in other embodiments, from about 0.1 wt. % to about 2.5 wt. %, and in other embodiments, from about 0.1 wt. % to about 2 wt. % of the BKG$_{[DJ3]}$ melanin. In some embodiments, the polymer composition may comprise about 1.0 wt. % BKF melanin. In some other embodiments, polymer composition may comprise about 1.5 wt. % BKF melanin.

As set forth above, the BKF melanin is substantially uniformly distributed throughout the polymer. The BKR$_{[DJ4]}$ melanin will be understood to be substantially uniformly distributed when there is no perceivable difference in the BKF melanin concentration at any point in the polymer. As will be appreciated, the BKF melanin is black in color and will visibly darken the polymer. So, it will be apparent that the BKF melanin is substantially uniformly distributed throughout the polymer when the color of the polymer appears the same throughout its volume.

In various embodiments, the polymer composition may comprise or be an additive for use in a paint, coating, sunscreen, packaging, composites or cosmetic products.

In a second aspect, the present invention is directed to a method of making these UV-light absorbing and antioxidant polymer compositions, as described below. In various embodiment, the method of making for making the UV-light absorbing and antioxidant polymer composition will begin with extraction of the allomelanin having UV radiation absorption and antioxidant properties from a black knot (*Apiosporina morbosa*) fungal growth using an acid-base extraction process.

In some embodiments, the acid-base extraction technique used to produce the melanin composition comprises the steps of: obtaining one or more black knot fungus (*Apiosporina morbosa*) having a black outer part and an inner wooden part; scraping the black outer part off of the inner wooden part, collecting it, and grinding it to a powder; boiling the powder in water to remove bacteria and dust; removing the water to leave a black residue of the powder; adding a quantity of an aqueous solution comprising one or more base to the black residue of the powder and autoclaving the mixture to solubilize the melanin in an aqueous environment and form a mixture having an aqueous black alkaline supernatant; collecting a black alkaline supernatant from the mixture and adding one or more acids to the black alkaline supernatant until the melanin precipitates out of the black alkaline supernatant, the melanin precipitate further comprising proteins, carbohydrates, and lipids; and collecting the melanin precipitate and refluxing it with one or more acids to hydrolyze some or all of the proteins, carbohydrates, and lipids and produce the melanin composition. In some embodiments, the one or more base is NaOH. In some of these embodiments, the step of autoclaving the mixture with one or more bases mixture to solubilize the melanin comprises: autoclaving the mixture a first time at a temperature of from about 100° C. to about 120° C. for from about 10 min to about 20 min; and autoclaving the mixture a second time at a temperature of from about 100° C. to about 120° C. for from about 10 min to about 20 min. In some of these embodiments, the one or more acids used to precipitate the melanin comprises concentrated HCl. In some embodiments, the step of adding one or more acids to precipitate the melanin comprises adding concentrated HCl to the black alkaline supernatant until the pH of the mixture reaches about 1.0. In some embodiments, the step of collecting the melanin precipitate from the black supernatant is performed by centrifugation. In one or more embodiments, the BKF melanin may be extracted using the methods set forth in U.S. Application Publication No. 2021/0269646 A1, the disclosure of which is incorporated herein by reference in its entirety.

The polymer selected is not particularly limited. Suitable polymers may include, without limitation, epoxides, siloxanes, rubber, acrylates, polyethylene, polypropylene, polystyrene, polyisobutylene, polybutadiene, polylactic acid, polyvinyl alcohol, and combinations thereof. In some embodiments, the polymer used may be a thermoset polymer, like rubber. In some other embodiments, the polymer used will be a thermoplastic. In some embodiments, the polymers will be a component of a paint, ink, coating, or cosmetic.

As will be apparent to those of skill in the art, however, the polymers used should not have a curing or other processing temperature high enough to damage the structure or properties of the BKF melanin. The curing and processing temperatures for the polymer being used should not exceed about 400° C. and preferably does not exceed about 300° C., which is the temperature at which the properties of the BKF melanin can begin to change. The exact temperatures where the BKF melanin begins to change may depend upon amount of water content in the BKF melanin, but is generally between about 300° C. and about 450° C. By 450° C., there may be significant structural changes to the BKF melanin. In various embodiments, the curing and/or processing temperature of the polymer used will be 350° C. or less. In some embodiments, the curing and/or processing temperature of the polymer used will be 300° C. or less, in other embodiments, 280° C. or less, in other embodiments, 250° C. or less, in other embodiments, 220° C. or less, in other embodiments, 200° C. or less, in other embodiments, 180° C. or less, in other embodiments, 160° C. or less, and in other embodiments, 100° C. or less. In one or more embodiments, the polymers used herein will be solids at ambient (room) temperatures when fully cured or crosslinked, but that need not be the case and in certain embodiments of the present invention the polymers used may be a liquid or gel at room temperatures.

Next, a selected quantity of the BKF melanin the BKF melanin is added to and then substantially uniformly distributed throughout the polymer. As set forth above, the BKR melanin will be understood to be substantially uniformly distributed throughout the polymer when there is no perceivable difference in the BKF melanin concentration at any point in the polymer. And because the BKF melanin is black in color and will visibly darken the polymer, the BKF melanin will, generally speaking, be substantially uniformly distributed throughout the polymer when the color of the polymer appears the same throughout its volume. One ordinary skill in the art will be able to determine whether the BKF melanin is substantially uniformly distributed throughout the polymer without undue experimentation.

To facilitate even distribution throughout the polymer, BKF melanin will have a relatively small and consistent diameter. In various embodiment, the BKF melanin will comprise DNH-based allomelanin particles having a mean diameter of from about 50 nm to about 1000 nm. In some embodiments, the BKF melanin will have a mean diameter of from about 50 nm to about 900 nm, in other embodiments, from about 50 nm to about 700 nm, in other embodiments, from about 50 nm to about 500 nm, in other embodiments, from about 50 nm to about 400 nm, in other embodiments, from about 50 nm to about 300 nm, in other embodiments, from about 100 nm to about 1000 nm, in other embodiments, from about 200 nm to about 1000 nm, in other embodiments, from about 300 nm to about 1000 nm, and in other embodiments, from about 500 nm to about 1000 nm.

In various embodiments, the amount of BKF melanin added will comprise from about 0.1 wt. % to about 5 wt. % of the composition. In some embodiments, the amount of BKF melanin added will comprise from about 0.5 wt. % to about 5 wt. %, in other embodiments, from about 1 wt. % to about 5 wt. %, in other embodiments, from about 1.5 wt. % to about 5 wt. %, in other embodiments, from about 2 wt. % to about 5 wt. %, in other embodiments, from about 2.5 wt. % to about 5 wt. %, in other embodiments, from about 3 wt. % to about 5 wt. %, in other embodiments, from about 0.1 wt. % to about 3 wt. %, in other embodiments, from about 0.1 wt. % to about 2.5 wt. %, and in other embodiments, from about 0.1 wt. % to about 2 wt. % of the composition. In some embodiments, the amount of BKF melanin added will comprise about 1.0 wt. % of the composition. In some other embodiments, the amount of BKF melanin added will comprise 1.5 wt. % of the composition.

In most embodiments, the BKF melanin is added as a powder or suspension, but this need not be the case. In some other embodiments, it may be dissolved and added as a solution. In these embodiments, the BKF melanin solution is prepared by adding a known mass to basic pH water (pH adjusted using NaOH, KOH, $NH_4OH$ or any other base). The basic pH deprotonates the melanin functionalities and aids in the dissolution of BKF melanin.

As will be apparent, the polymer used must be sufficiently softened and pliable to allow the BKF melanin to be mixed throughout the polymer. The process for doing this will, of course depend upon the type of polymer being used. In some embodiments, the polymer will be a thermopolymer and is a cured solid polymer at room temperature but will become soft when heated above its $T_g$ and a liquid when heated above its melting temperature ($T_m$). In these embodiments, the polymer is placed in suitable mechanical mixer and heated to a temperature above its $T_g$ such that it softens to the point that it can be mixed using the mechanical mixer, but preferably not above its $T_m$. While heating the polymer above its melting temperature will, of course, allow the polymer to be mixed using the mechanical mixer and is within the scope of the present invention, it is not generally necessary to do so and, depending upon the type of mixer being used there is a chance the liquid polymer could leak and/or cause other problems.

In some embodiments, the polymer will be a two-part polymer comprising a polymer resin and an appropriate curing agent. These polymers will often, but not always, require an outside energy source, generally heat of light, to cure. In some embodiments, the polymer resin may be a solid, but in other embodiments, the polymer resin may be a liquid, viscous liquid, or even a gel. In some embodiments, the polymer resin will already contain the curing agent. In some of these embodiments, the polymer may comprise solid polymer pellets already containing packets of the curing agent. In other embodiments, the polymer resin and the curing agent are mixed to form a prepolymer mixture that is then cured to form the final polymer. In some embodiments, this prepolymer mixture is chemically cured at room temperature. In some other embodiments, this prepolymer mixture is cured by exposing it UV light until it is cured. In some other embodiments, this prepolymer mixture is cured by heating it to a temperature above its curing temperature until it is cured.

In most of these systems, only a small amount of curing agent is required relative to the quantity of polymer resin. Accordingly, while the BKF melanin may be added to either component prior to their mixing to for a prepolymer for curing, the BKF melanin is preferably added to the polymer resin rather than the curing agent to facilitate distribution throughout the polymer.

In some embodiments, the polymer or polymer resin is a solid and is placed in a heated mixer of a type generally known in the art for working with solid polymers in resins. As will be understood by those of skill in the art, these devices have a heated chamber for softening or melting a polymer or resin and a mixer having sufficient power to mix highly viscous polymers and resins. Suitable heated mixers can be obtained through C. W. BRABENDER™ Instruments, Inc. (South Hackensack, NJ). In various embodiments where the polymer or resin are a solid, they are placed in a heated mixer and heated to a temperature above the $T_g$ of the polymer, but less than about 310° C., until sufficiently softened for mixing.

In some other embodiments where the polymer resin used is not a solid, the polymer resin, BKF melanin, and curing agent are mixed and the mixture then cured to form the polymer. In some embodiments, the polymer resin and BKF melanin are first combined and thoroughly mixed so that the BKF melanin is substantially uniformly distributed throughout the polymer and then the curing agent is added. If possible, is again mixed to ensure BKF melanin is substantially uniformly distributed throughout the polymer before the polymer cures or is cured.

In some other embodiments, the polymer or polymer resin is softened or dissolved in a suitable solvent before the BKF melanin is added. The resulting mixture is then blended until the BKF melanin is substantially uniformly distributed throughout the polymer. In some of these embodiments, a curing agent may them be added and the polymer may be cured, as set forth above. In some embodiments, a BKF melanin solution may be mixed with a polyvinyl alcohol (PVA) polymer solution to create PVA films with a known melanin content. The BKF melanin solution was prepared by adding a known mass to basic pH water (pH adjusted using NaOH, KOH, $NH_4OH$ or any other base). As set forth above, the basic pH deprotonates the melanin functionalities and aids in the dissolution of BKF melanin. In one or more of these embodiments, an 8 wt. % solution of PVA is prepared and heated to 80° C. and about 2 wt. % of glycerol is added as a plasticizer. The mixture is then cast in a nonstick mold to produce films of the melanin containing PVA polymer. In some other embodiments, the BKF melanin may be added to dissolved polymers in paints, coatings, or inks.

In many thermoset polymers, like rubber or high-density polyethylene (HDPE), are cured by heating them to a curing temperature for a specified time. As will be understood by those in the art, the curing times and temperatures depends greatly upon the polymer and curing system used. One of ordinary skill in the art, will be able to determine the determine an appropriate curing time and temperature without undue experimentation. For commercially available polymers, this information is generally provided by the manufacturer. In many of these systems, heat is applied to cure the polymer as it is being formed into a particular shape by the device used to do so. In various embodiments, the heat for curing the polymer may be applied by such things as a press, mold, or extruder.

In some embodiments, for example, the solid polymer or polymer resin are placed in a heated mixer and heated to a temperature of about 180° C. for 5-10 min to soften the polymer or polymer resin. The BKF melanin was then added, and the mixture blended until the BKF melanin is substantially uniformly distributed throughout the polymer and cured in a press at 4 MPa at 180° C. for about 10 minutes. In another embodiment, natural rubber is masticated in a heated mixer (about 40 RPM) at about 80° C. for from about 30 to about 60 min. The BKF melanin was then added, and the mixture blended until the BKF melanin is substantially uniformly distributed throughout the polymer. The curing agent was then added, and the material further mixed for about 10 to about 20 minutes. Again, the polymer was cured in a heated press at 4 MPa at 180° C. for about 10 minutes.

In various other embodiments, a polymer solution or even a polymer melt containing the BKF melanin may be prepared and then applied to the surface such as in a paint, ink, or coating. Once applied, the polymers will harden to contain the BKF melanin thereby providing the UV blocking and antioxidant properties to not only the paint, ink, or coating, but also the underlying surface. In some other embodiments, the BKF melanin and polymer compositions of the present invention may be added to various types of cosmetic preparations and compounds as a UV absorber, antioxidant, and darkening pigment.

In a third aspect, the present invention is directed to a method of reducing UV-radiation and antioxidant damage to a polymer composition, as described below. In these embodiments, UV-radiation and antioxidant damage may be reduced by using the BKF melanin containing polymer compositions. In one or more embodiments, the present invention includes a method of reducing UV-radiation and antioxidant damage to a polymer composition comprising: extracting allomelanin from a black knot (*Apiosporina morbosa*) fungal growth using an acid-base extraction process, the allomelanin having UV radiation absorption and antioxidant properties; selecting a one part or two part polymer having a glass transition temperature ($T_g$) of 300° C. or less wherein the two part polymer, if present, comprises a polymer resin and a curing agent; heating a polymer or polymer resin to a temperature above its $T_g$ but less than 310° C.; adding from about 0.1% to about 5% by weight of the extracted allomelanin, and adding the curing agent, if a two part polymer was used; blending the mixture until the extracted allomelanin is distributed evenly throughout the polymer mixture; and curing or allowing the polymer mixture containing the allomelanin to harden and/or cure. If necessary, these polymer compositions may be cured by light or heat after application to the surface. In some other embodiments, the BKF melanin may be added to dissolved polymers in paints, coatings, or inks.

In all of these embodiments, the UV radiation absorption and antioxidant properties of the allomelanin are incorporated into the polymer composition as set forth above, thereby reducing the damage suffered by the polymer composition upon exposure to UV radiation and/or free radicals. In some embodiments, plastic products may be made of or incorporate BKF melanin polymer compositions of the present invention to prevent oxidation and sun damage. Similarly, the BKF melanin may be added to dissolved polymers in paints, coatings, or inks and applied to surfaces to prevent oxidation and sun damage to both the paint, coating, or ink and the underlying surface. If necessary, these polymer compositions may be cured by light or heat after application to the surface. It is also believed that the BKF melanin and polymer compositions of the present invention may be used not only as a darkening pigment, but also as a UV absorber and antioxidant in various types of cosmetic preparations and compounds.

EXPERIMENTAL

To better describe and further reduce the invention to practice, melanin was extracted from black knot fungi and its UV absorbance and antioxidant properties were evaluated and characterized.

Black Knot Melanin Extraction and Characterization

Melanin was extracted from black knots (*Apiosporina morbosa*) obtained from a local farm in Ohio using a known protocol. (See, Singla, S., Htut, K. Z., Zhu, R., Davis, A., Ma, J., Ni, Q. Z., . . . & Dhinojwala, A. (2021). Isolation and Characterization of Allomelanin from Pathogenic Black Knot Fungus—a Sustainable Source of Melanin. ACS omega 2021, 6, 51, 35514-35522; U.S. Application Publication No. 2021/0269646 A1, the disclosures of which are incorporated herein by reference in their entirety). Briefly, black knots were first scraped for the black outer part, which was then ground into a fine powder using a ball mill. About 6 g of powder obtained from previous step was added to water and then boiled at 120° C. for 10 min to kill any bacteria and remove dust particles. After discarding water from the previous step, the left-over black residue was mixed with 250 mL of 1M NaOH and autoclaved at 120° C. for 20 min twice. This step facilitates solubilization of melanin in aqueous media, when was then separated in the supernatant phase from the remaining constituents by centrifugation at 8000 rpm for 15 min. Afterwards, melanin was precipitated using a concentrated HCl solution (37%) until pH equals 1. The precipitated melanin was then collected by centrifugation at 8000 rpm for 15 min, which was further refluxed in concentrated HCl solution (37%) for 1 day to hydrolyze proteins, carbohydrates, and lipids associated with melanin. The final product was rinsed with ultrapure water thrice, ethanol once, and water once again before lyophilizing to obtain the melanin powder (~600 mg, 10% yield). Prior work on characterizing the extracted melanin suggests that the extracted melanin has irregular morphology with chemistry like nitrogen-free allomelanin (1,8-dihydroxynaphthalene based). (See, Singla, S., Htut, K. Z., Zhu, R., Davis, A., Ma, 1, Ni, Q. Z., . . . & Dhinojwala, A. (2021). Isolation and Characterization of Allomelanin from Pathogenic Black Knot Fungus—a Sustainable Source of Melanin. ACS omega 2021, 6, 51, 35514-35522, the disclosure of which is incorporated herein by reference).

UV-Vis Absorbance

To evaluate the UV-vis absorption properties of black knot fungal (BKF) melanin, UV-vis absorption spectra were collected using an Agilent Cary 60 UV-visible spectrophotometer in the range of 300-800 nm. The extracted melanin was dissolved in 1M NaOH at a concentration of 1 mg/mL. Subsequently, different dilutions with blank 1M NaOH were made to collect the UV-Vis absorption spectra for 0.005, 0.01, 0.015, 0.02, and 0.025 mg/mL concentration solutions, that obey the Beer-Lambert law. The same NaOH solution was used as a control.

DPPH Assay for Antioxidant Activity 2,2-diphenyl-1-(2,4,6-trinitrophenyl) hydrazyl (DPPH) radical scavenging activity of BKF melanin was measured according to the procedure described in the literature. (See, e.g., X. Zhou, N. C. McCallum, Z. Hu, W. Cao, K. Gnanasekaran, Y. Feng, J. F. Stoddart, Z. Wang, and N. C. Gianneschi, "Artificial allomelanin nanoparticles," *ACS nano*, vol. 13, no. 10, pp. 10980-10990, 2019; K.-Y. Ju, Y. Lee, S. Lee, S. B. Park, and J.-K. Lee, "Bioinspired polymerization of dopamine to generate melanin-like nanoparticles having an excellent free-radical-scavenging property," Biomacromolecules, vol. 12, no. 3, pp. 625-632, 2011, the disclosures of which are incorporated herein by reference in their entirety.) Briefly, 0.1 mM of DPPH solution in 95% ethanol was freshly prepared for use. Subsequently, a suspension of BKF melanin (1-2 mg/mL) was prepared. To 4 mL of the DPPH solution in a clean glass vial, different volumes of BKF solution were added and shaken for 15-20 min in the dark. Afterwards, the UV-vis absorbance spectra were collected to monitor the decrease in the absorbance at 517 nm due to quenching of DPPH radical by the BKF melanin. Similar volumes of BKF melanin solution were added to pure ethanol (instead of 0.1 mM DPPH solution) to measure the absorbance of BKF melanin itself. Afterwards, the scavenging activity (or antioxidant activity) [I] was calculated using Equation 1, where $A_c$ is the absorbance of DPPH solution without any BKF melanin, $A_i$ is the absorbance of DPPH solution mixed with varying amounts of BKF melanin, and $A_j$ is the absorbance of BKF melanin itself without DPPH solution.

$$I = \left(1 - \frac{A_i - A_j}{A_c}\right) * 100\% \qquad (1)$$

Ascorbic acid was used a positive control to establish the methodology. The antioxidant activity of BKF melanin was compared with two well characterized eumelanins: polydopamine (also known as PDA) and sepia melanin. PDA nanoparticles were prepared in the laboratory using ammonium hydroxide as a catalyst using the procedure described by Xiao et al. (See, M. Xiao, Y. Li, M. C. Allen, D. D. Deheyn, X. Yue, J. Zhao, N. C. Gianneschi, M. D. Shawkey, and A. Dhinojwala, "Bio-inspired structural colors produced via self-assembly of synthetic melanin nanopartidcles," *ACS nano*, vol. 9, no. 5, pp. 5454-5460, 2015, the disclosure of which is incorporated herein by reference in its entirety.) Sepia melanin used in the present study was purchased from Sigma-Aldrich.

Results and Discussion

As set forth above, black knot is a disease caused by the pathogenic fungus *Apiosporina morbosa*, which results in tumor-like outgrowth on branches of fruit trees, which darkens over time into hard woody black knots (FIG. 1). It has been shown that black knots are rich in nitrogen-free allomelanin, which can be extracted using the acid-base extraction procedure at a yield of 10%. (See, Singla, S., Fitut, K. Z., Zhu, R., Davis, A., Ma, J., Ni, Q. Z., . . . & Dhinojwala, A. (2021). Isolation and Characterization of Allomelanin from Pathogenic Black Knot Fungus—a Sustainable Source of Melanin. ACS omega 2021, 6, 51, 35514-35522; U.S. Application Publication No. 2021/0269646 A1, the disclosures of which are incorporated herein by reference in their entirety). This cheap and green source of melanin benefits the environment as a waste byproduct transformed into a resource, high in demand for various applications. In the present work, we evaluate the potential of this extracted melanin as a UV-absorber and as an antioxidant, which would greatly benefit the plastics, packaging, and cosmetics industries.

Figure 2:
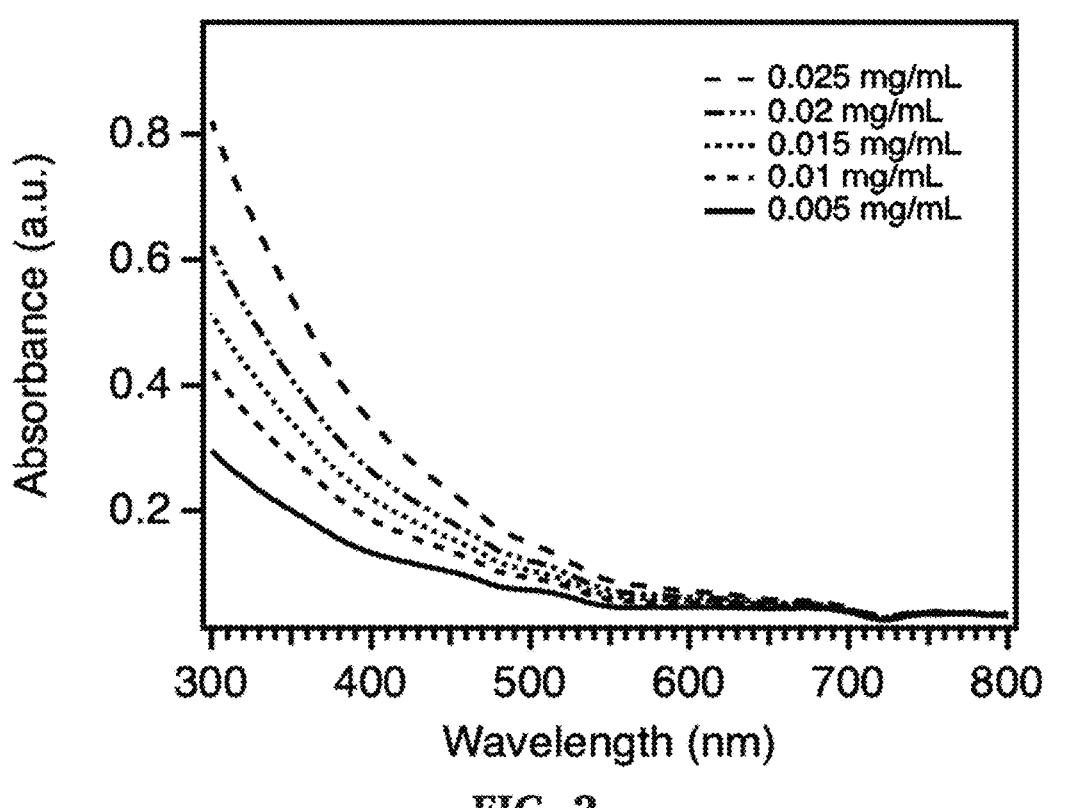
FIG. 2 is a UV-vis absorbance spectra of BKF melanin dissolved in 1M NaOH solutions at different concentrations.

BKF melanin UV-vis absorption properties were evaluated by creating different concentration solutions in 1M NaOH. FIG. 2 shows the UV-vis spectra for BKF melanin, which shows a broadband absorption of light from 300 to 800 nm typical of most melanins. The absorbance is high in the UV region and gradually decreases as the wavelength increases, because the complex conjugated structure of melanin can absorb UV photons and blue solar light. As the concentration of extracted melanin increases, the absorbance increases as shown in FIG. 2.

Figure 3A:
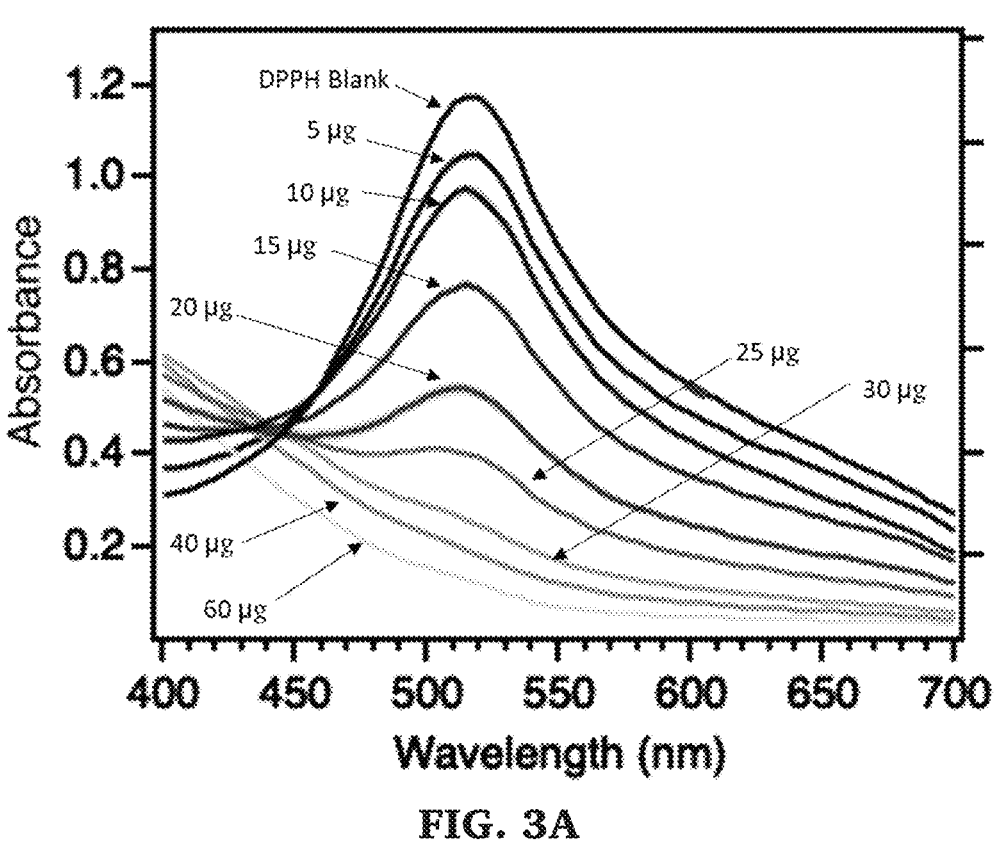
FIGS. 3A-B are graphs showing (i) absorbance plotted as a function of wavelength for 0.1 mM DPPH solution containing varying amounts (0-60 μg) of ascorbic acid (FIG. 3A), finding that as the ascorbic acid mass increases, the absorbance of DPPH at 517 nm decreases due to quenching of DPPH radical by ascorbic acid and (ii) calculating antioxidant activity (%) as a function of mass of ascorbic acid, which reaches a saturated value of ~90% at masses greater than or equal to 40 μg (FIG. 3B).
Figure 3B:
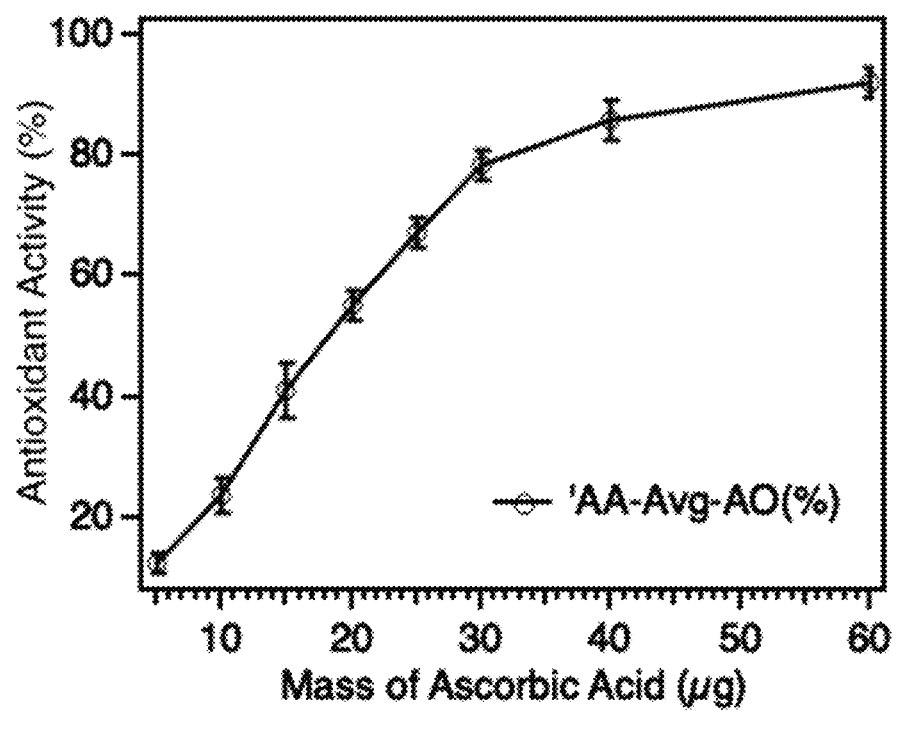
Figure 4:
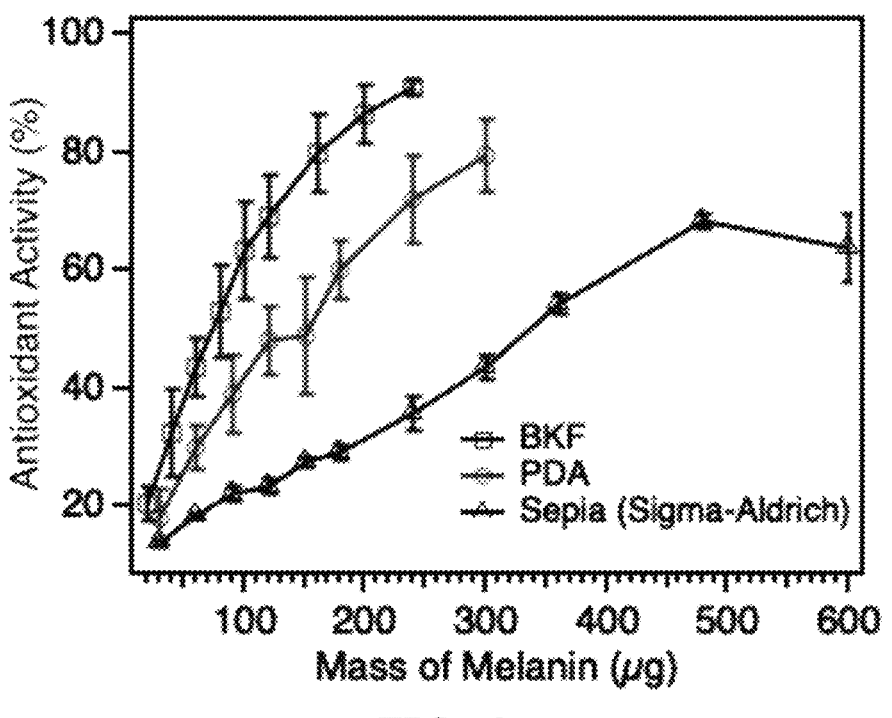
FIG. 4 is a graph comparing the % antioxidant activity of BKF melanin with two other well characterized eumelanins: polydopamine (PDA) and sepia melanin, showing and highlighting that the BKF melanin has a higher antioxidant activity than the other eumelanins tested.

The antioxidant activity of BKF melanin was investigated using the DPPH assay described above. The scavenging activity was determined by monitoring the decrease in absorbance of DPPH at 517 nm, since the DPPH is reduced through an electron transfer from the antioxidant material. We used ascorbic acid as a control to establish the methodology. FIG. 3A shows the absorbance vs. wavelength plot for 0.1 mM DPPH solutions containing increasing amounts of ascorbic acid. As the ascorbic acid concentration increases from 0 to 60 μg, the absorbance at 517 nm decreases along with visual change in color from purple to yellow. The antioxidant activity (%) calculated using Equation 1 is plotted as a function of ascorbic acid mass in FIG. 3B. The antioxidant activity (%) increases with increasing mass of ascorbic acid and reaches a saturated value of ~90% at masses greater than or equal to 40 μg, consistent with literature. (See, e.g., X. Zhou, N. C. McCallum, Z. Hu, W. Cao, K. Gnanasekaran, Y. Feng, J. F. Stoddart, Z. Wang, and N. C. Gianneschi, "Artificial allomelanin nanoparticles," *ACS nano*, vol. 13, no. 10, pp. 10980-10990, 2019, the disclosure of which is incorporated herein by reference.) Using a similar approach, we calculated the antioxidant activity of BKF melanin, PDA, and sepia melanin. FIG. 4 shows a comparison of the antioxidant activity of three different melanins. Scavenging activity for BKF melanin per gram of material is much higher than that of PDA and sepia melanin, highlighting its potential as a great natural antioxidant.

CONCLUSIONS

BKF melanin, which is obtained from a waste by-product, is a great UV absorber and a great antioxidant. The antioxidant activity of BKF melanin actually surpasses that of PDA and sepia melanin. Therefore, BKF melanin could serve as a super-additive for polymers, packaging, and cosmetics applications.

EXAMPLES

The following examples are offered to more fully illustrate the invention but are not to be construed as limiting the scope thereof. Further, while some of examples may include conclusions about the way the invention may function, the inventor does not intend to be bound by those conclusions but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Melanin Extraction

Melanin was extracted from black knots using an acid-base extraction procedure. Black knots were scraped for the black outer part leaving the internal wooden part intact. The black part (coarse grains, ~6 g) was ground into a fine powder using a ball mill before boiling in water at 120° C. for 10 min to remove any bacteria and dust particles. After discarding water from the previous step, the left-over black residue was mixed with 250 mL of 1M NaOH and autoclaved at 120° C. for 20 min twice. This step aids in solubilizing the melanin in aqueous media, which was then separated in the supernatant phase from the remaining components by centrifugation at 8000 rpm for 15 min. Afterwards, a concentrated HCl solution (37%) was added to the supernatant until pH equals 1 to allow precipitation of melanin. The precipitated melanin was then collected by centrifugation at 8000 rpm for 15 min, which was further refluxed in concentrated HCl solution (37%) for 1 day to hydrolyze the proteins, carbohydrates, and lipids associated with melanin. The final product was rinsed with ultrapure water (×3), ethanol (×1), and water (×1) again before lyophilizing it to obtain the final melanin powder.

Example 2

Effect of Temperature on the Antioxidant Properties of BKF Melanin

Figure 5:
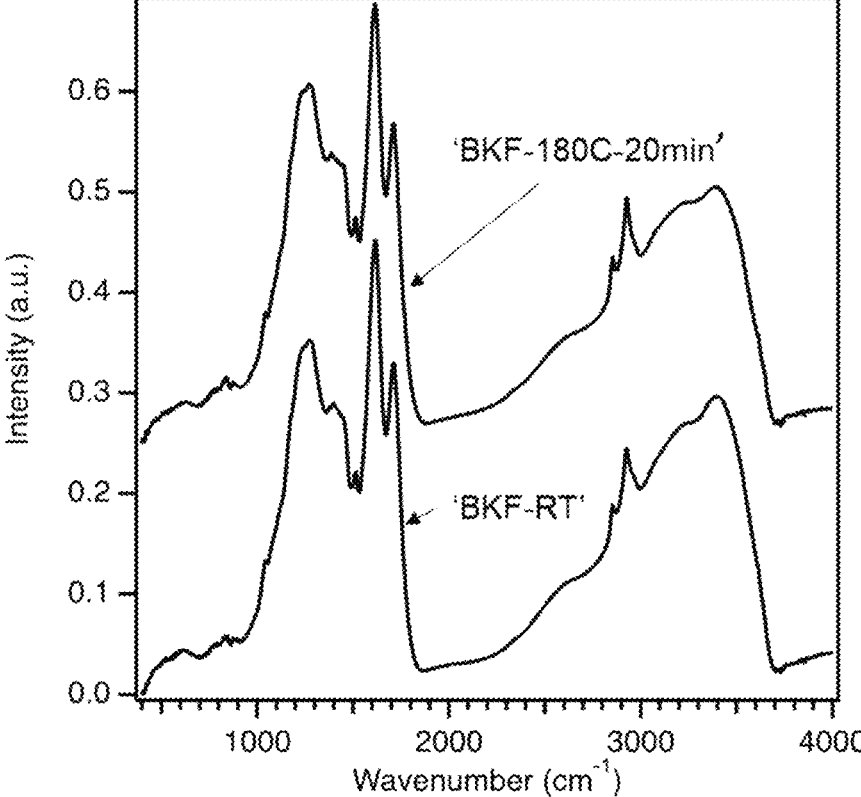
FIG. 5 is a comparison of IR spectra of BKF melanin powders at room temperature (native extracted melanin, "BKF-RT") and of melanin heated to 180° C., ('BKF-180 C-20 min"), showing the similar spectral features for the two different treatment conditions indicates that the melanin chemistry stays intact even after heating BKF melanin to 180 degrees C.

To blend BKF melanin with various thermoplastic polymers for various application, it is necessary to heat the polymers beyond their glass transition temperature ($T_g$). To explore this avenue and see if the antioxidant properties of BKF melanin stay intact at elevated temperature, melanin obtained from black knot was heated to 180° C. in a Brabender mixer for 20 min (since 20 min was sufficient to blend the melanin throughout polymer by mechanical mixing). The chemistry of melanin which has not been heated (labelled as "BKF-RT") and melanin which has been heated to 180° C. for 20 min (labelled as "BKF-180 C-20 min") was compared using infrared spectroscopy. The results are shown in FIG. 5. As can be seen, the BKF antioxidant activity of the melanin containing polymer stays intact even after heating to 180° C. No significant changes in chemistry were observed.

Figure 6A:
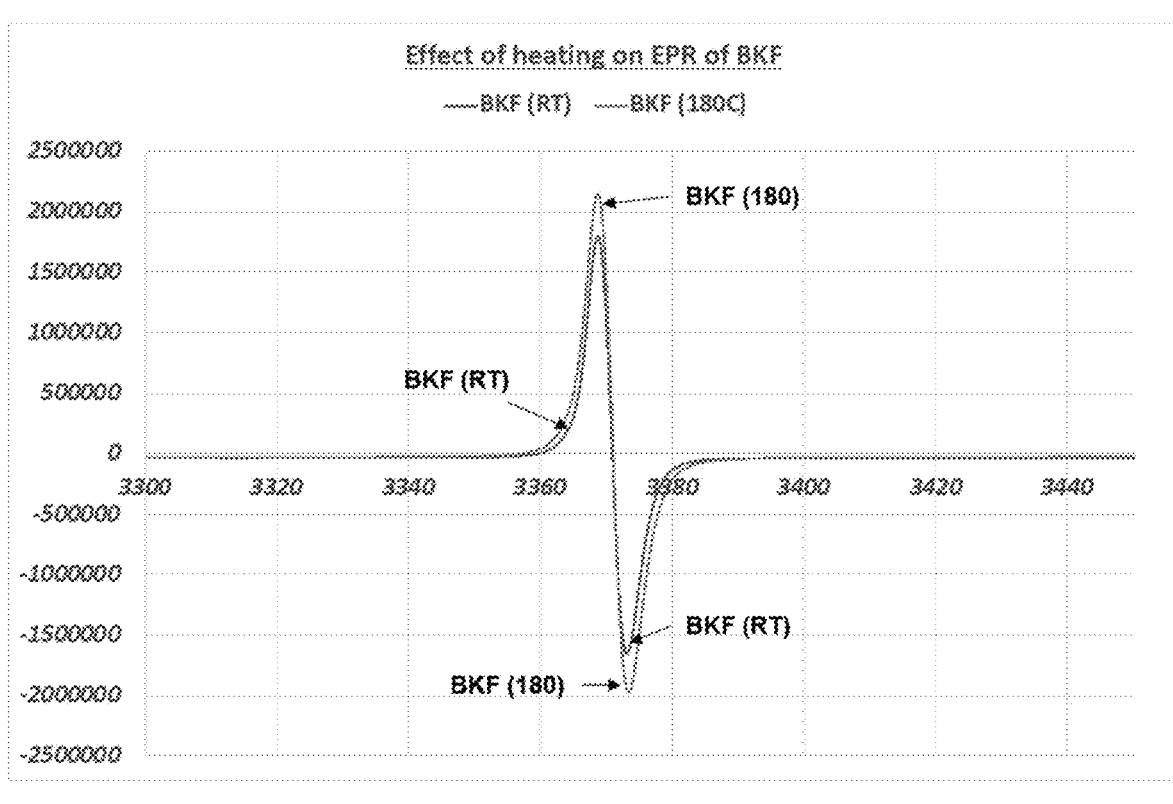
FIG. 6A-B are (FIG. 6A) an EPR spectra of BKF powders (native extracted melanin, BKF (RT); melanin heated to 180 C, BKF (180 C)) showing the presence of paramagnetic signatures even at 180 degrees C. indicates the presence of free radicals in the BKF melanin at higher temperature, which might aid in strong antioxidant properties and (FIG. 6B) the antioxidant activity (%) of BKF powders (native extracted melanin, BKF (RT); melanin heated to 180 degrees C., BKF (180 C)).
Figure 6B:
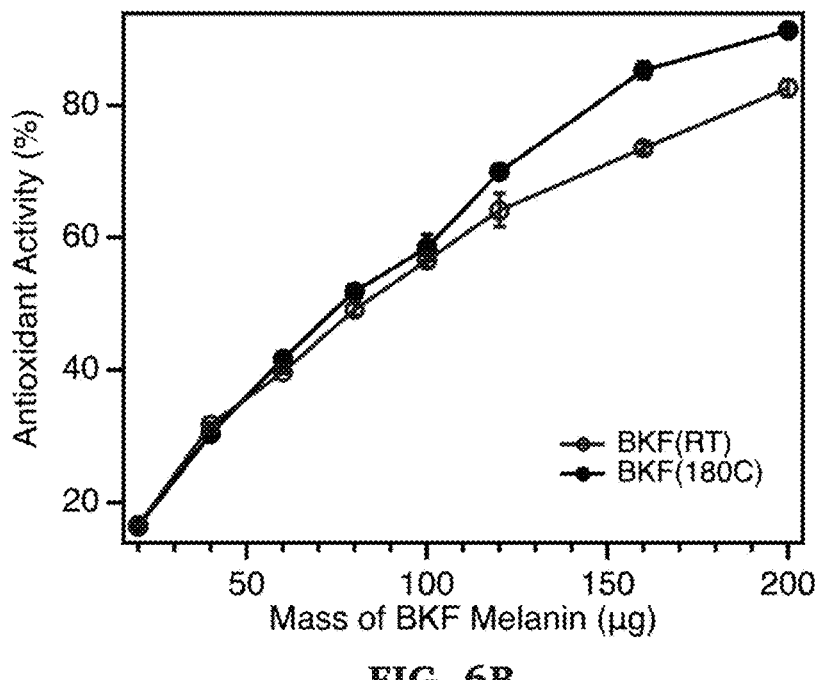

The antioxidant activity of BKF melanin at an elevated temperature was also evaluated by EPR spectra and a DPPH assay. The results are reported in FIG. 6A, which shows that the BKF powder heated to 180 C shows the presence of free radicals in a manner like the BKF powder which has not been heated. The presence of paramagnetic signatures even at 180 degrees C. indicates the presence of free radicals in the BKF melanin at higher temperature, which might aid in strong antioxidant properties. Further, the results of the DPPH assay are reported in (FIG. 6B), which clearly shows that antioxidant properties as good as or event better than at room temperature.

Example 3

Physical Mixing of Melanin Powder with Polymer

Figure 7:
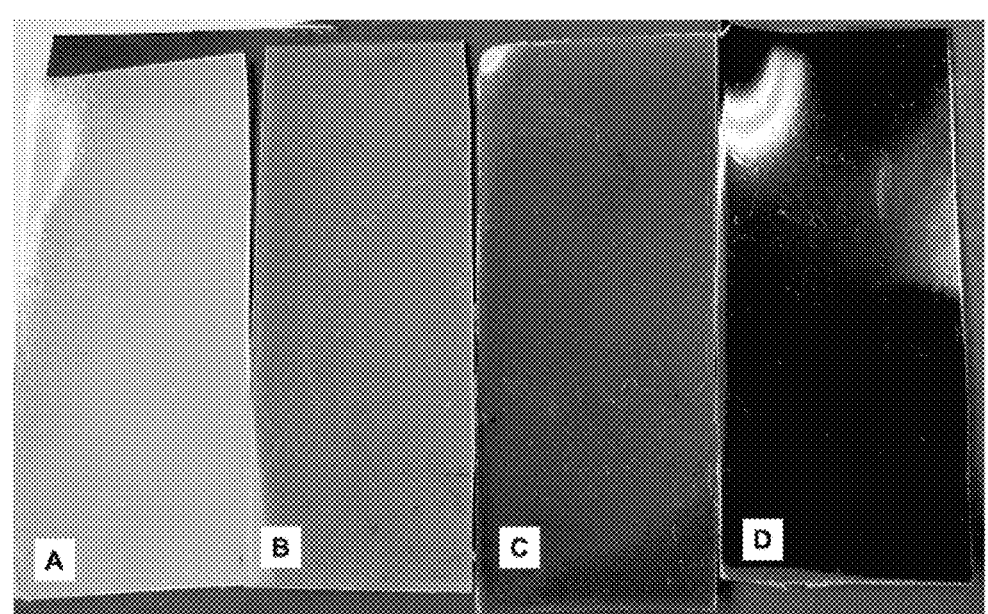
FIG. 7 are comparative images of composite sheets made by mixing extracted BKF melanin powder in high-density polyethylene (HDPE) polymer in Brabender heated blending equipment followed by compression molding of the blended mixture showing (A) Control (only HDPE) (B) 0.1 wt. % melanin, (C) 0.25 wt. % melanin and (D) 0.5 wt. % melanin.
Figure 8A:
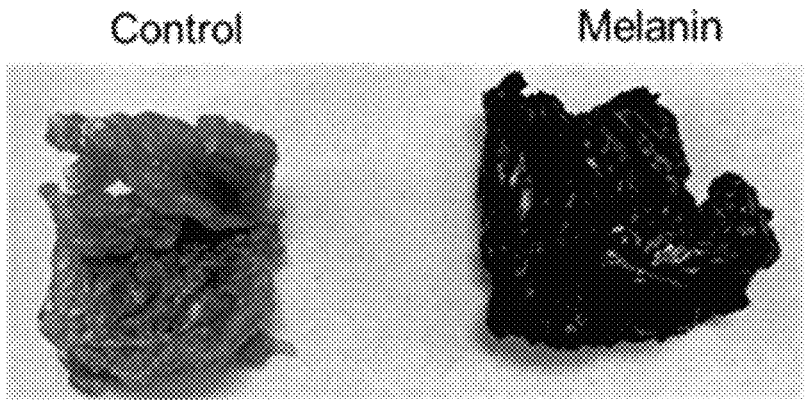
FIGS. 8A-B images of compounded samples before (FIG. 8A) and after (FIG. 8B) pressing. The melanin sample (right) was made by mixing natural rubber with 1 wt. % of BKF melanin. The control samples (left) contain only natural rubber.
Figure 8B:
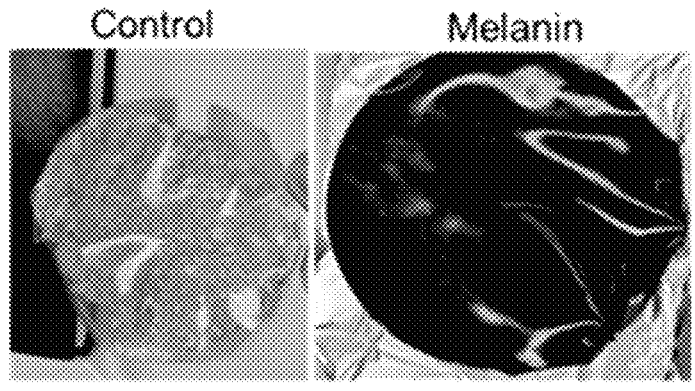

As an example, the extracted BKF melanin was physically mixed with two different kinds of polymers and evaluated. In one example, high density polyethylene (HDPE) pellets were heated in the Brabender heated mixer at 180° C. for 5 minutes to melting of HDPE pellets. Following that, melanin was added in different concentrations (FIG. 7) and the system was mixed for further 5 minutes. The compounded melt mixture was then removed from the equipment and pressed in the form of sheets in a press at 4 MPa at 180° C. for 10 minutes followed by cooling. In other example, natural rubber was masticated in the Brabender equipment at 80° C. for 10 minutes at 40 rpm. After that, about 1 wt. % melanin was added, and the system was mixed for 5 minutes. Finally, 1 wt. % of the curing agent, dicumyl peroxide was added and system was mixed further for 5 minutes. The compounded material was pressed at 180° C. under 4 MPa for 10 minutes followed by cooling to get cured sheets. (See, e.g., Candau, Nicolas, et al. Polymer Testing 101 (2021): 107313, the disclosure of which in incorporated herein by reference.) FIGS. 8A-B show compounded samples of the natural rubber (left) and natural rubber with 1 wt. % of BKF melanin (right) before (FIG. 8A) and after (FIG. 8B) pressing.

Example 4

Mixing BKF Melanin Solution with Polymer Solution

Figure 9:
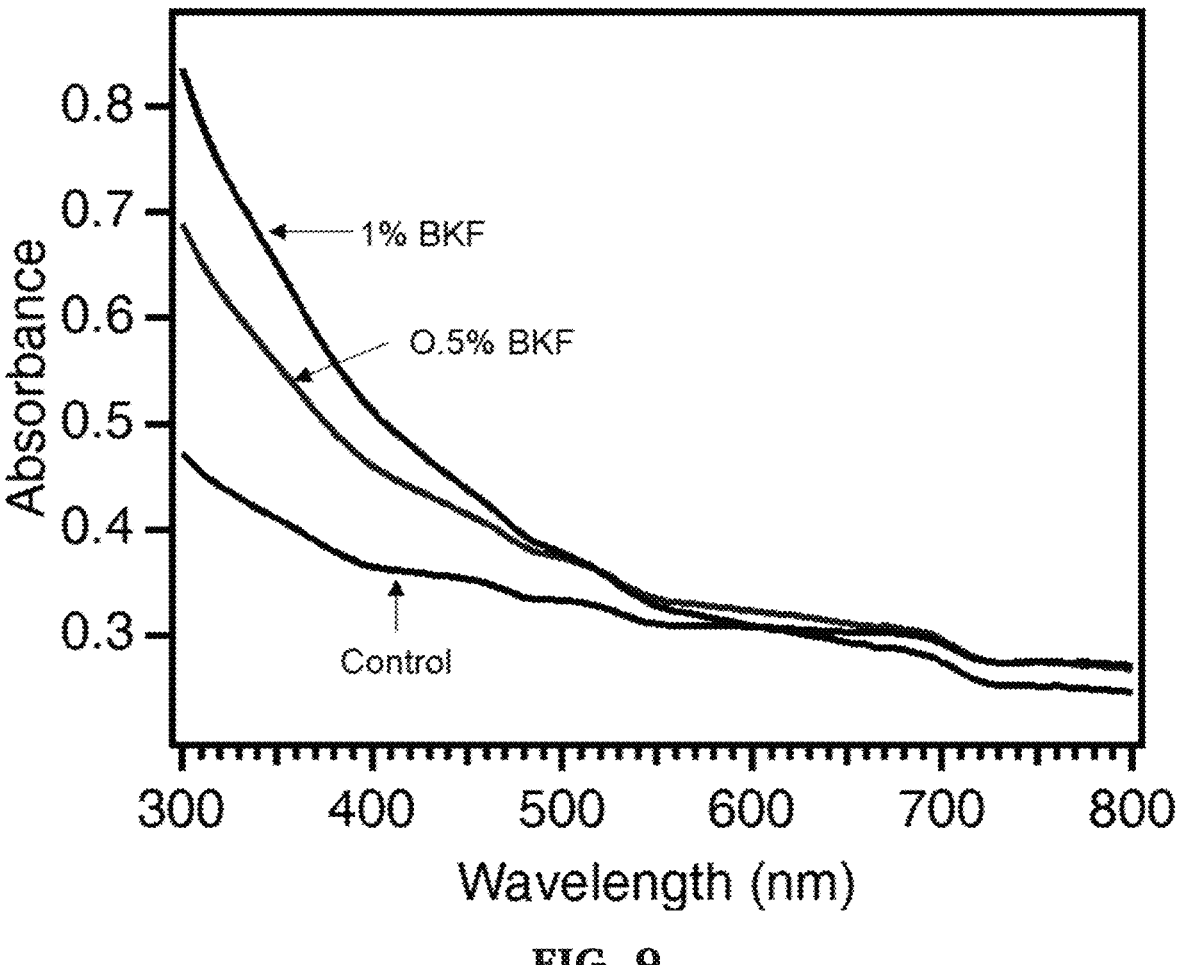
FIG. 9 is an absorbance vs. wavelength (nm) plot for polyvinyl alcohol (PVA) films with no added BKF melanin (control) and 0.5 wt. % and 1 wt. % of dissolved BKF melanin solution added to the PVA solution before film casting. The data clearly shows that the BKF melanin containing films show high absorbance in the UV region compared to control.

As an example, BKF melanin solution was mixed with a polyvinyl alcohol (PVA) polymer solution to create PVA films with different melanin content. The BKF melanin solution was prepared by adding a known mass to basic pH water (pH adjusted using NaOH, KOH, $NH_4OH$ or any other base). The basic pH deprotonates the melanin functionalities and aids in the dissolution of BKF melanin. Then, an 8 wt. % solution of PVA was prepared and heated to 80° C. and about 2 wt. % of glycerol was added as a plasticizer. Afterwards, different volumes of melanin containing solution were added to the PVA solution and mixed. These solutions were then cast onto Teflon molds to create thin films of PVA with and without melanin as a control. An absorbance vs. wavelength (nm) plot for polyvinyl alcohol (PVA) films having no added BKF melanin (control), 0.5 wt. % and 1 wt. % BKF melanin solution added before film casting is shown in FIG. 9. This data clearly shows that the BKF melanin containing films had high absorbance in the UV region compared to control, indicating that the addition of soluble BKF melanin to the PVA films increases their UV absorption capability.

In light of the foregoing, it should be appreciated that the present invention significantly advances the art by providing a UV light absorbing antioxidant additive that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A UV-radiation absorbing and antioxidant polymer composition comprising:
   A) a polymer having a glass transition temperature ($T_g$) of 300° C. or less; and
   B) allomelanin extracted from a black knot (*Apiosporina morbosa*) fungal growth, said allomelanin comprising UV-radiation absorbing and antioxidant properties;
   wherein the allomelanin is substantially uniformly distributed throughout said polymer and the UV-radiation absorbing and antioxidant properties are incorporated into the polymer composition.

2. The UV-light blocking and antioxidant polymer composition of claim 1 wherein said polymer is selected from the group consisting of epoxides, siloxanes, rubber, acrylates, polyethylene, polypropylene, polystyrene, polyisobutylene, polybutadiene, polylactic acid, polyvinyl alcohol, and combinations thereof.

3. The UV-light blocking and antioxidant polymer composition of claim 1 wherein said polymer is a thermoplastic or thermoset polymer.

4. The UV-light blocking and antioxidant polymer composition of claim 1 wherein said polymer is rubber.

5. The UV-light blocking and antioxidant polymer composition of claim 1 wherein said allomelanin comprises particles having a mean diameter of from about 50 nm to about 1000 nm.

6. The UV-light blocking and antioxidant polymer composition of claim 1 comprising from about 0.1 wt. % to about 5 wt. % of said allomelanin.

7. The UV-light blocking and antioxidant polymer composition of claim 1 comprising from about 1 wt. % to about 5 wt. % of said allomelanin.

8. The UV-light blocking and antioxidant polymer composition of claim 1 wherein said polymer composition comprises a paint, coating, sunscreen, packaging, composites or cosmetic product.

9. A method of making for making the UV-light absorbing and antioxidant polymer composition of claim 1 comprising:
   A) extracting allomelanin from a black knot (*Apiosporina morbosa*) fungal growth using an acid-base extraction process, said allomelanin having UV radiation absorption and antioxidant properties;
   B) selecting a one part or two-part polymer having a glass transition temperature ($T_g$) of 300° C. or less wherein said two part polymer, if present, comprises and polymer resin and a curing agent;
   C) heating a polymer or polymer resin to a temperature above its Tg but less than 310° C.;
   D) adding from about 0.1% to about 5% by weight of the extracted allomelanin of step A, and adding the curing agent, if a two-part polymer was used;
   E) blending the mixture of step D until said extracted allomelanin is distributed evenly throughout the polymer mixture; and
   F) curing or allowing the polymer mixture containing the allomelanin to harden and/or cure to form the UV-light blocking and antioxidant polymer composition;
   wherein the UV-light absorbing and antioxidant properties of the allomelanin are incorporated into said polymer composition to form the UV-light absorbing and antioxidant polymer composition of claim 1.

10. The method of claim 9 wherein said one part or two-part polymer is selected from the group consisting of epoxides, siloxanes, rubber, acrylates, polyethylene, polypropylene, polystyrene, polyisobutylene, polybutadiene, polylactic acid, polyvinyl alcohol, polyurethanes, polyesters and biopolymers including chitosan, alginate, gelatin, and combinations thereof.

11. The method of claim 9 wherein said one part or two-part polymer is a thermoplastic or thermoset polymer.

12. The method of claim 9 wherein said one part or two part polymer is rubber.

13. The method of claim 9 wherein the polymer composition is a coating and step E further comprises applying the allomelanin/polymer mixture to a surface.

14. The method of claim 9 wherein said one part or two-part polymer is rubber and the step of curing (step F) comprises heating the allomelanin/polymer mixture of step E to a temperature of about 180° C. for from about 8 min to about 30 min.

15. The method of claim 9 wherein the polymer composition is a paint, coating, sunscreen, packaging, composite or cosmetic product.

16. A method of reducing UV-radiation and antioxidant damage to a polymer composition comprising:
   A) extracting allomelanin from a black knot (*Apiosporina morbosa*) fungal growth using an acid-base extraction process, said allomelanin having UV radiation absorption and antioxidant properties;
   B) selecting a one part or two-part polymer having a glass transition temperature ($T_g$) of 300° C. or less wherein said two part polymer, if present, comprises a polymer resin and a curing agent;
   C) heating a polymer or polymer resin to a temperature above its $T_g$ but less than 310° C.;
   D) adding from about 0.1% to about 5% by weight of the extracted allomelanin of step A, and adding the curing agent, if a two-part polymer was used;
   E) blending the mixture of step D until said extracted allomelanin is distributed evenly throughout the polymer mixture; and
   F) curing or allowing the polymer mixture containing the allomelanin to harden and/or cure;
   wherein the UV radiation absorption and antioxidant properties of said allomelanin are incorporated into said polymer composition thereby reducing the damage suffered by the polymer composition upon exposure to UV radiation and/or free radicals.

17. The method of claim 16 wherein said one part or two part polymer is selected from the group consisting of epoxides, siloxanes, rubber, acrylates, polyethylene, polypropylene, polystyrene, polyisobutylene, polybutadiene, polylactic acid, polyvinyl alcohol, polyurethanes, polyesters and biopolymers including chitosan, alginate, gelatin, and combinations thereof.

18. The method of claim 16 wherein said one part or two-part polymer is a thermoplastic or thermoset polymer.

19. The method of claim 16 wherein said one part or two-part polymer is rubber.

20. The method of claim 16 wherein the polymer composition is a coating and step E further comprises applying the allomelanin/polymer mixture to a surface.

21. The method of claim 16 wherein said one part or two-part polymer is natural rubber and the step of curing (step F) comprises heating the allomelanin/polymer mixture of step E to a temperature of about 180° C. for from about 8 min to about 30 min.

* * * * *